(12) United States Patent
Lee et al.

(10) Patent No.: US 8,290,291 B2
(45) Date of Patent: Oct. 16, 2012

(54) DIGITAL PHOTOGRAPHING APPARATUS AND METHOD OF CONTROLLING THE SAME

(75) Inventors: Seung-yun Lee, Changwon (KR); Shinri Takahashi, Changwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1008 days.

(21) Appl. No.: 12/291,423

(22) Filed: Nov. 10, 2008

(65) Prior Publication Data

US 2009/0175511 A1 Jul. 9, 2009

(30) Foreign Application Priority Data

Jan. 4, 2008 (KR) .................. 10-2008-0001432

(51) Int. Cl.
*G06K 9/40* (2006.01)
(52) U.S. Cl. ...................... 382/254; 382/118
(58) Field of Classification Search ........... 382/100–320
See application file for complete search history.

(56) References Cited

U.S. PATENT DOCUMENTS

| | | | | |
|---|---|---|---|---|
| 4,746,988 A * | 5/1988 | Nutting et al. | ............. | 348/221.1 |
| 5,353,058 A * | 10/1994 | Takei | ............. | 348/363 |
| 6,940,545 B1 * | 9/2005 | Ray et al. | ............. | 348/222.1 |
| 7,269,292 B2 * | 9/2007 | Steinberg | ............. | 382/243 |
| 7,315,630 B2 * | 1/2008 | Steinberg et al. | ............. | 382/118 |
| 7,315,631 B1 * | 1/2008 | Corcoran et al. | ............. | 382/118 |
| 7,382,928 B2 * | 6/2008 | Wong et al. | ............. | 382/254 |
| 7,403,643 B2 * | 7/2008 | Ianculescu et al. | ............. | 382/118 |
| 7,430,333 B2 * | 9/2008 | Yu et al. | ............. | 382/254 |
| 7,460,694 B2 * | 12/2008 | Corcoran et al. | ............. | 382/118 |
| 7,542,600 B2 * | 6/2009 | Yu et al. | ............. | 382/167 |
| 7,574,128 B2 * | 8/2009 | Matsuda | ............. | 396/264 |
| 7,796,831 B2 * | 9/2010 | Tanaka | ............. | 382/274 |
| 7,881,600 B2 * | 2/2011 | Okamoto | ............. | 396/121 |
| 7,948,524 B2 * | 5/2011 | Endo et al. | ............. | 348/222.1 |
| 7,986,808 B2 * | 7/2011 | Ikeda | ............. | 382/103 |
| 8,050,465 B2 * | 11/2011 | Ianculescu et al. | ............. | 382/118 |
| 8,055,029 B2 * | 11/2011 | Petrescu et al. | ............. | 382/118 |
| 2003/0210336 A1 | 11/2003 | Khan et al. | | |
| 2004/0109614 A1 * | 6/2004 | Enomoto et al. | ............. | 382/275 |
| 2005/0123211 A1 * | 6/2005 | Wong et al. | ............. | 382/254 |
| 2005/0265626 A1 * | 12/2005 | Endo et al. | ............. | 382/274 |
| 2006/0115157 A1 * | 6/2006 | Mori et al. | ............. | 382/190 |

(Continued)

FOREIGN PATENT DOCUMENTS

CN 1705347 A 12/2005
JP 2007-251558 A 9/2007

OTHER PUBLICATIONS

Examination Report established for GB 0820357.2 (Oct. 19, 2011).
Office Action established for CN 200810177294.X (Mar. 16, 2012).

*Primary Examiner* — Manav Seth
(74) *Attorney, Agent, or Firm* — Drinker Biddle & Reath LLP (57) ABSTRACT

A digital photographing apparatus is provided which can recognize a face even in a dark place, such as under a backlight condition, or in too bright a place, and also provided is a method of controlling the same. According to the method, when a face is not recognized, an exposure value is temporarily adjusted so as to generate an image signal, and a face recognition algorithm is performed from the image signal.

12 Claims, 7 Drawing Sheets

U.S. PATENT DOCUMENTS

| | | | |
|---|---|---|---|
| 2007/0065134 A1* | 3/2007 | Sugimoto | 396/165 |
| 2007/0177050 A1* | 8/2007 | Xiao et al. | 348/371 |
| 2007/0286488 A1* | 12/2007 | Fukuda | 382/190 |
| 2008/0118156 A1* | 5/2008 | Okada | 382/195 |
| 2008/0247611 A1* | 10/2008 | Aisaka et al. | 382/118 |
| 2008/0309788 A1* | 12/2008 | Onozawa | 348/222.1 |
| 2009/0080713 A1* | 3/2009 | Bigioi et al. | 382/118 |
| 2009/0160968 A1* | 6/2009 | Prentice et al. | 348/223.1 |
| 2011/0249142 A1* | 10/2011 | Brunner | 348/229.1 |

* cited by examiner

DIGITAL PHOTOGRAPHING APPARATUS AND METHOD OF CONTROLLING THE SAME

CROSS-REFERENCE TO RELATED PATENT APPLICATION

This application claims the benefit of Korean Patent Application No. 10-2008-0001432, filed on Jan. 4, 2008 in the Korean Intellectual Property Office, the entire contents of which is incorporated herein by reference.

BACKGROUND OF THE INVENTION

1. Field of the Invention

The present invention relates to a digital photographing apparatus and a method of controlling the same. More particularly, the present invention relates to a digital photographing apparatus which performs a face recognition algorithm, and a method of controlling the same.

2. Description of the Related Art

A conventional digital photographing apparatus cannot recognize a face of a subject when it is too dark, such as due to a backlight, or too bright. In other words, a face recognition algorithm is typically properly performed only in limited circumstances.

SUMMARY OF THE INVENTION

The present invention provides a digital photographing apparatus which can effectively utilize a face recognition algorithm, and a method of controlling the same.

According to an embodiment of the present invention, there is provided a method of controlling a digital photographing apparatus. This method includes: generating a first image signal by photographing a face of a subject; performing a face recognition algorithm by using the first image signal; adjusting an exposure value when the face cannot be recognized from the first image signal; generating a second image signal by photographing the face of the subject under the adjusted exposure value; and performing the face recognition algorithm by using the second image signal.

In the adjusting of the exposure value, when the face is not recognized because a current exposure value is bigger than a standard exposure value for recognizing a face or a standard exposure value range, adjusting the exposure value to a first exposure value that is smaller than the current exposure value, and when the face is not recognized because the current exposure value is smaller than the standard exposure value or the standard exposure value range, adjusting the exposure value to a second exposure value that is bigger than the current exposure value.

The first or second exposure value may be equal to the standard exposure value or corresponds to the standard exposure value range.

In the adjusting of the exposure value, the exposure value may be converted to have at least one pulse form. The first image signal may be generated in a section where a signal for converting the exposure value to have a pulse form is not inputted, and the second image signal may be generated in a section where the signal is inputted.

The method further includes displaying the first image signal in a preview mode.

After performing the face recognition algorithm by using the second image signal, the method further includes: determining the exposure value based on the recognized face; generating a third image signal by photographing the subject under the determined exposure value.

The exposure value may be determined according to a first release signal and the third image signal may be generated by photographing the subject according to a second release signal.

The method further includes displaying the third image signal in a play back mode.

According to another embodiment of the present invention, there is provided a digital photographing apparatus which includes: an imaging unit, which generates an image signal by photographing a face of a subject; a face recognizer, which recognizes the face from the image signal; and a first exposure controller, which controls an exposure value when the face is not recognized by the face recognizer.

The first exposure controller may adjust the exposure value to a first exposure value that is smaller than a current exposure value when the face is not recognized because the current exposure value is bigger than a standard exposure value for recognizing a face or a standard exposure value range, and may adjust the exposure value to a second exposure value that is bigger than the current exposure value when the face is not recognized because the current exposure value is smaller than the standard exposure value or the standard exposure value range.

The digital photographing apparatus further includes a second exposure controller, which determines the exposure value based on the recognized face when the face of the subject is recognized by the face recognizer.

The digital photographing apparatus further includes a manipulator, which inputs a first release signal so that the exposure value is determined by the second exposure controller, and inputs a second release signal so that a third image signal is generated.

The imaging unit may generate a first image signal under the current exposure value, generate a second image signal under the exposure value adjusted by the first exposure controller, and generate a third image signal under the exposure value determined by the second exposure controller.

The face recognizer may include: a face recognition determiner, which determines whether the face of the subject can be recognized from the first image signal; and a face recognition algorithm performer, which recognizes the face by performing a face recognition algorithm from the second image signal.

The digital photographing apparatus further includes a displayer, which displays the first image signal in a preview mode and displays the third image signal in a play back mode.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Exemplary embodiments of the present invention will now be more fully described in detail with reference to the attached drawings, in which exemplary embodiments of the invention are shown. While describing the present invention, only the parts that are required to understand operations of the present invention will be described, and other parts that may diminish the clarity of the points of the present invention may be omitted.

Terms or words used in the detailed description and claims should not be interpreted as having conventional or dictionary's definitions, but should be interpreted as having meanings and concepts that are suitable to the technical aspects of the present invention that can most suitably express the present invention.

Figure 1:
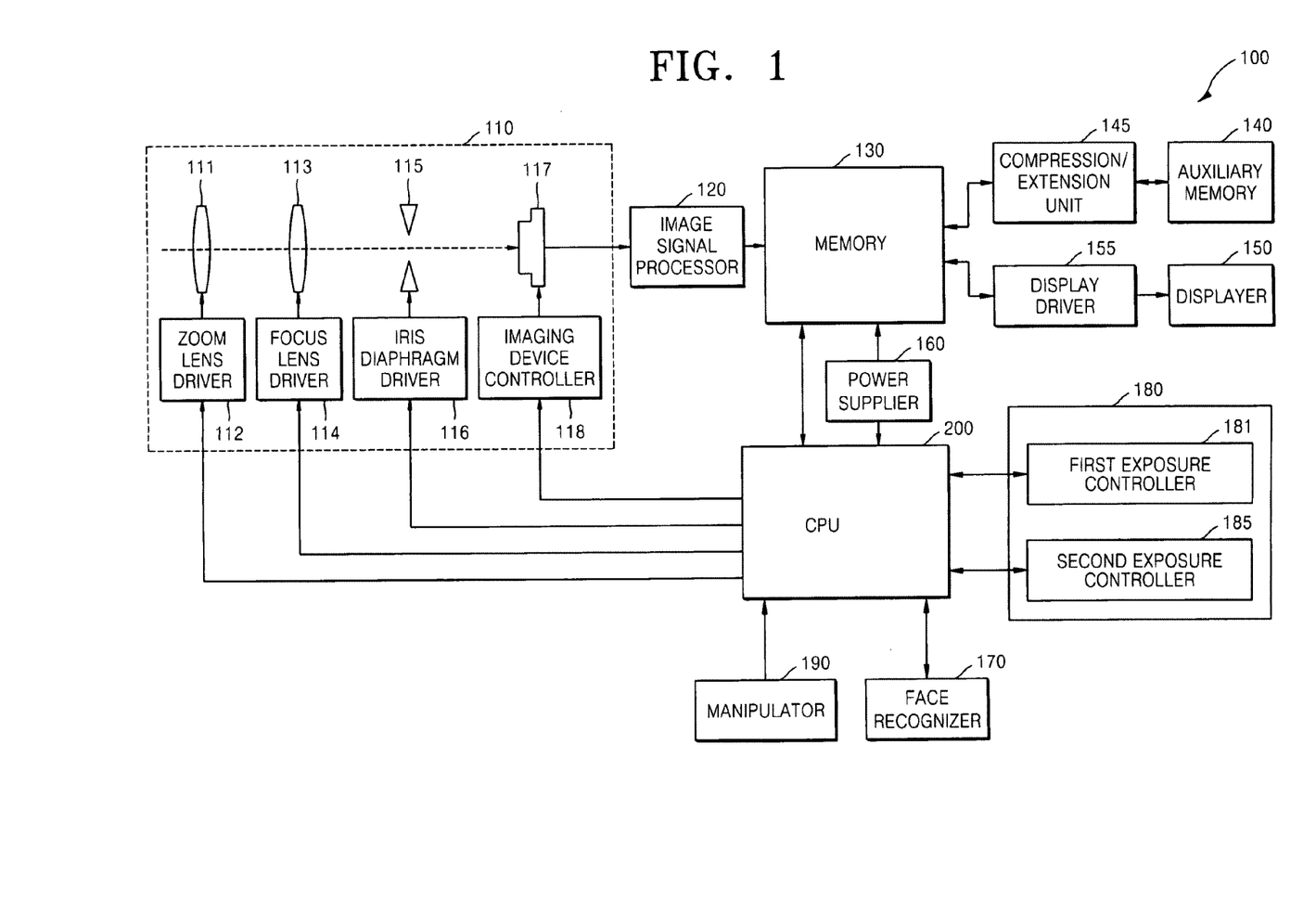
FIG. 1 is a block diagram illustrating an example of a digital photographing apparatus according to an embodiment of the present invention.

FIG. 1 is a block diagram illustrating an example of a digital photographing apparatus 100 according to an embodiment of the present invention. Elements of the digital photographing apparatus 100 will be described according to their operations.

Regarding processes of photographing a subject, light from the subject penetrates a zoom lens 111 and a focus lens 113, which are optical systems of an imaging unit 110, whose amount is adjusted according to opening and closing of an iris diaphragm 115, and then reaches a light-receiving surface of an imaging device 117 so as to form an image of the subject. The image formed on the light-receiving surface of the imaging device 117 is converted to an electric image signal via a photoelectric conversion process.

The imaging device 117 may be a charge coupled device (CCD), which converts an optical signal to an electric signal, or a complementary metal oxide semiconductor image sensor (CIS). The iris diaphragm 115 is opened during a normal state or while performing an auto focusing algorithm that is performed by receiving a first release signal generated by pressing a release button (not shown) by half, and can perform an exposure process by receiving a second release signal generated by gently pressing the release button.

The locations or the like of the zoom lens 111 and the focus lens 113 are respectively controlled by a zoom lens driver 112 and a focus lens driver 114. For example, when a wide angle-zoom signal is generated, a view angle is widened as a focus length of the zoom lens 111 is decreased, and when a telephoto-zoom signal is generated, the view angle is narrowed as the focus length of the zoom lens 111 is increased. The location of the focus lens 113 is adjusted after the location of the zoom lens 111 is determined, and thus the view angle is not affected by the location of the focus lens 113. The opening and closing of the iris diaphragm 115 is controlled by an iris diaphragm driver 116, and the sensitivity of the imaging device 117 is controlled by an imaging device controller 118.

The zoom lens driver 112, the focus lens driver 114, the iris diaphragm driver 116, and the imaging device controller 118 control corresponding elements according to results of operations performed by a central processing unit (CPU) 200 based on exposure information, focus information, etc.

Regarding processes of generating an image signal, an image signal outputted from the imaging device 117 is inputted to an image signal processor 120. When the image signal received from the imaging device 117 is an analog signal, the image signal processor 120 converts the image signal to a digital signal and performs various image processes on the digital signal. After such image processes, the image signal is temporarily stored in a memory 130.

In detail, the image signal processor 120 improves the quality of an image by performing signal processes, such as auto white balance, auto exposure, and gamma correction, so as to convert image data to be suitable to the vision of a person, and outputs an image signal with the improved image quality. Also, the image signal processor 120 performs image processes, such as color filter array interpolation, color matrix, color correction, and color enhancement.

The memory 130 includes a program memory (not shown), which stores a program about an operation of the digital photographing apparatus 100 irrelevantly to power supply to the digital photographing apparatus 100, and a main memory (not shown), which temporarily stores the image data and other data while the power is supplied to the digital photographing apparatus 100.

The program memory stores an operating program, which operates the digital photographing apparatus 100, and various application programs. Also, the CPU 200 controls each element according to programs stored in the program memory.

The main memory temporarily stores the image signal outputted from the image signal processor 120 or an auxiliary memory 140.

The main memory may be directly connected to a power supplier 160, separately from supplying power to the digital photographing apparatus 100. Accordingly, codes pre-stored in the program memory may be copied to the main memory or changed to codes executable by the main memory so as to quickly boot the digital photographing apparatus 100, and data stored in the main memory can be quickly read when the digital photographing apparatus 100 is re-booted.

The image signal stored in the main memory is outputted to a display driver 155, and then converted to an analog signal and simultaneously converted to an optimum image signal to be displayed. Also, the converted image signal is displayed on a displayer 150 so as to be shown in a predetermined image. During a photographing mode, the displayer 150 may operate as a viewfinder for determining a photographing range by continuously displaying image signals obtained by the imaging device 117. Examples of the displayer 150 vary, and include a liquid crystal display (LCD), an organic light emitting diode (OLED), and an electrophoretic display device (EDD).

Regarding processes of recording the image signal generated as above, the image signal is temporarily stored in the memory 130, and at this time, various types of information about the image signal is stored in the memory 130 with the image signal. Also, the image signal and the information are inputted to a compression/extension unit 145. The compression/extension unit 145 forms an image file by performing an optimum compression process for storing by a compression circuit, i.e. an encoding process such as JPEG, and the image file is stored in the auxiliary memory 140.

Examples of the auxiliary memory 140 vary, and include a fixed type semiconductor memory, such as an external flash memory, a semiconductor memory, such as a card type flash memory that can have a card shape or a stick shape and can be freely removed from a device, and a magnetic storage medium, such as a hard disk or a floppy disk.

Regarding processes of reproducing an image, the image file compressed and recorded in the auxiliary memory 140 is inputted to the compression/extension unit 145, and then is extension-processed by an extension circuit, i.e. decoded so as to extract an image signal from the image file. Then, the image signal is outputted to the memory 130. The image signal is temporarily stored in the memory 130, and can be reproduced as a predetermined image on the displayer 150 via the display driver 155.

The digital photographing apparatus 100 includes a face recognizer 170. In detail, the face recognizer 170 determines whether the face of the subject can be recognized from the image signal, and performs a face recognition algorithm.

Figure 2:
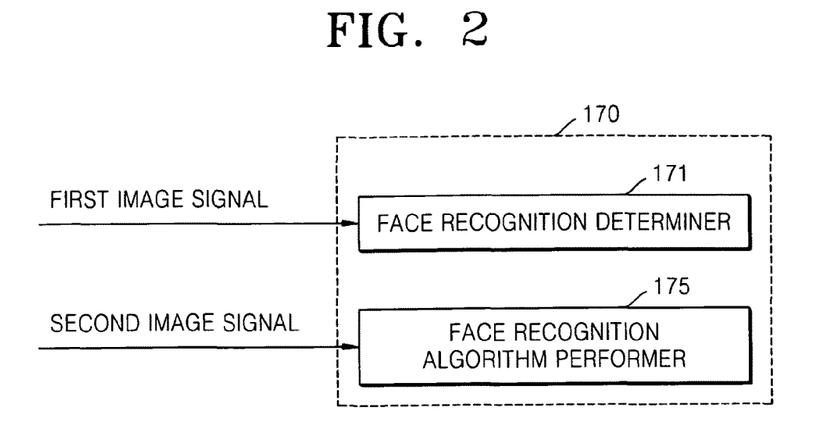
FIG. 2 is a block diagram illustrating an example of a face recognizer of the digital photographing apparatus illustrated in FIG. 1.

The face recognizer 170 will now be described in more detail with reference to FIG. 2. FIG. 2 is a block diagram illustrating an example of the face recognizer 170 of the digital photographing apparatus 100 illustrated in FIG. 1.

Referring to FIG. 2, the face recognizer 170 includes a face recognition determiner 171, which determines whether the face of the subject is recognized. The face recognition determiner 171 determines whether the face of the subject is recognized based on a first image signal. The first image signal is an image signal generated by initially recognizing the subject. The first image signal is generated in a preview mode, before generating an image signal for recording and reproducing, by photographing the subject. The first image signal is displayed on the displayer 150 during the preview mode so as to determine the photographing range.

The face recognition determiner 171 may determine that the face cannot be recognized when a luminance value of the first image signal is smaller than a luminance value that can recognize the face. Alternatively, the face recognition determiner 171 may determine that the face cannot be recognized when a skin color of the face is not drawn, or an eye or a mouth is not detected in an area corresponding to the skin color by performing the face recognition algorithm.

The face recognizer 170 further includes a face recognition algorithm performer 175, which performs the face recognition algorithm. The face recognition algorithm performer 175 recognizes the face of the subject from a second image signal. The second image signal is a data value of performing an image signal process of adjusting an exposure value when the face is not recognized from the first image signal. The second image signal is also an image signal generated in the preview mode, before generating the image signal for recording and reproducing. The second image signal is generated by applying an exposure value for face recognition, and may not be displayed on the displayer 150. When the exposure value is adjusted by inputting a plurality of pulse form signals, the second image signal is generated in a section where the pulse form signals are inputted and the first image signal is generated in a section where the pulse form signals are not inputted. Accordingly, when the second image signal is displayed on the displayer 150, a flickering image may be displayed. This is not only disadvantageous in determining a subject to be photographed, but also increases eye fatigue of a user.

The face recognition algorithm performer 175 performs the face recognition algorithm by extracting a skin color area from the image signal, extracting a contour line based on luminance change in the extracted skin color area, and determining whether two eyes and a mouth exist in eyes and mouth areas that are experimentally measured. This is only an example, and the face can be recognized not only by determining geometrical elements according to positions of the eyes and mouth, but also by reflecting a face image from the geometrical elements and then extracting features by comparing or correlating the face image with projection of a pre-stored face image. Alternatively, the face may be recognized by comparing the face image with a template image that shows the whole face, and analyzing the correlation between the face image and the template image. Alternatively, the face may be recognized by using information about learning and recognition of a nerve network via a learning recognition method using an artificial nerve network.

Referring back to the example illustrated in FIG. 1, the digital photographing apparatus 100 includes an exposure controller 180. The exposure controller 180 includes a first exposure controller 181, which recognizes a face, and a second exposure controller 185, which adjusts the exposure value based on a recognized face.

In detail, when the face recognition determiner 171 determines that the face cannot be recognized from the first face signal, the first exposure controller 181 adjusts a current exposure value of the first image signal to a first exposure value that is smaller than the current exposure value or a second exposure value that is bigger than the current exposure value. Accordingly, the image signal processor 120 generates the second image signal by processing the image signal according to the first or second exposure value.

The second exposure controller 185 determines the exposure value based on the face recognized by performing the face recognition algorithm from the second image signal by the face recognition algorithm performer 175. The exposure value may be determined by using an automatic exposure algorithm, which detects brightness of the subject from the image signal received in the preview mode and automatically adjusts the brightness of the subject so that the brightness of the subject is close to the desired brightness. A third image signal may be generated by using the determined exposure value. The third image signal is generated by photographing the subject for record and reproduction. The third image signal is generated by adjusting sensitivity, shutter speed, or an iris diaphragm value according to the determined exposure value, and enables a user to obtain a desired image signal.

The digital photographing apparatus 100 further includes a manipulator 190, which receives an external signal of a user or the like. The manipulator 190 includes a shutter release button for opening or closing a shutter so as to expose the imaging device 117 to light for a predetermined time, a power supply button for supplying power, a wide angle-zoom and telephoto-zoom button for widening or narrowing a view angle, buttons for selecting a character input mode, a photographing mode, or a reproducing mode, and various function buttons for selecting a white balance setting function, an exposure setting function, etc.

The CPU 200 operates according to an operation system and application programs stored in the memory 130, temporarily stores the result of operation, and controls corresponding element according to the result of operation so as to operate the digital photographing apparatus 100 as described above.

Accordingly, when the face is not recognized under dark light, such as a backlight, or too bright light, the exposure value is adjusted so as to perform the face recognition algorithm. Thus, a range for performing the face recognition algorithm can be increased.

Figure 3:
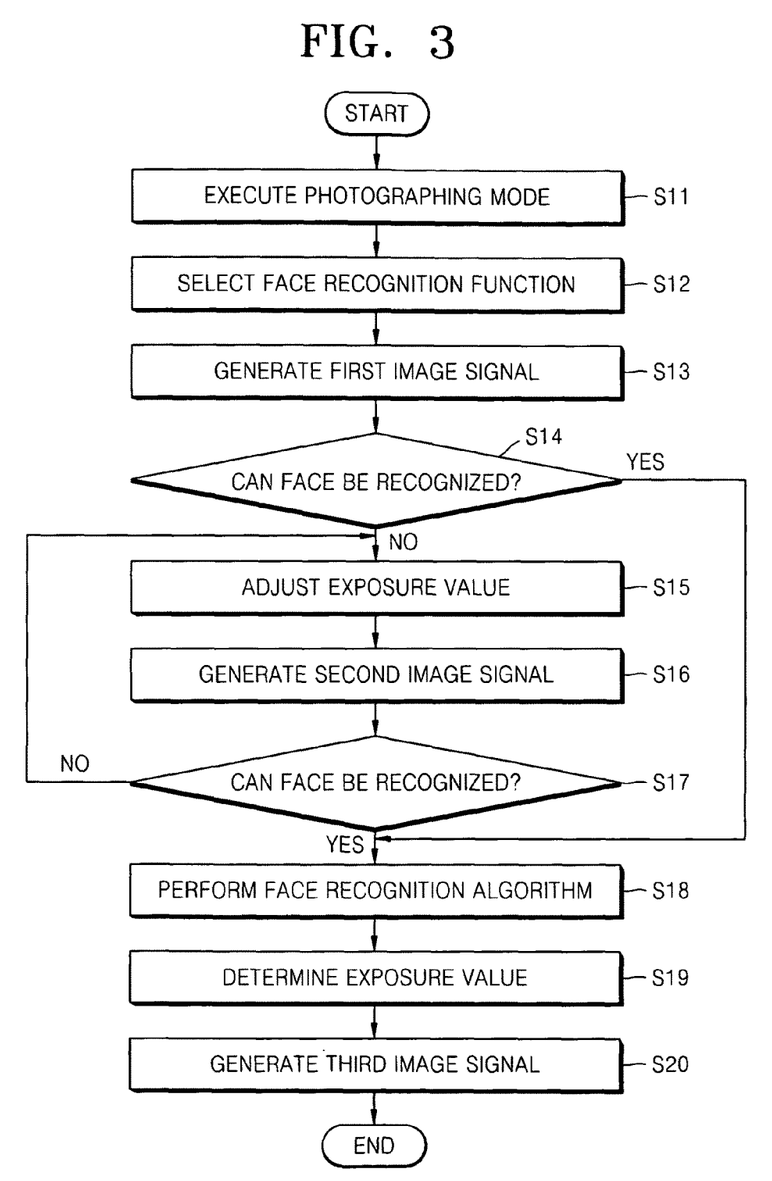
FIG. 3 is a flowchart illustrating an example of a method of controlling a digital photographing apparatus, according to an embodiment of the present invention.

FIG. 3 is a flowchart illustrating an example of a method of controlling a digital photographing apparatus, according to an embodiment of the present invention.

Referring to FIG. 3, a photographing mode is executed in operation S11, and a face recognition function is selected in operation S12.

Then, a first image signal is generated by photographing a subject in operation S13. The first image signal is an image signal inputted via an imaging unit in a preview mode.

It is determined whether the face of the subject can be recognized from the first image signal in operation S14. Such determination can be performed by determining whether the first image signal has a standard luminance value for recognizing a face or is within a standard luminance range.

Figure 4A:
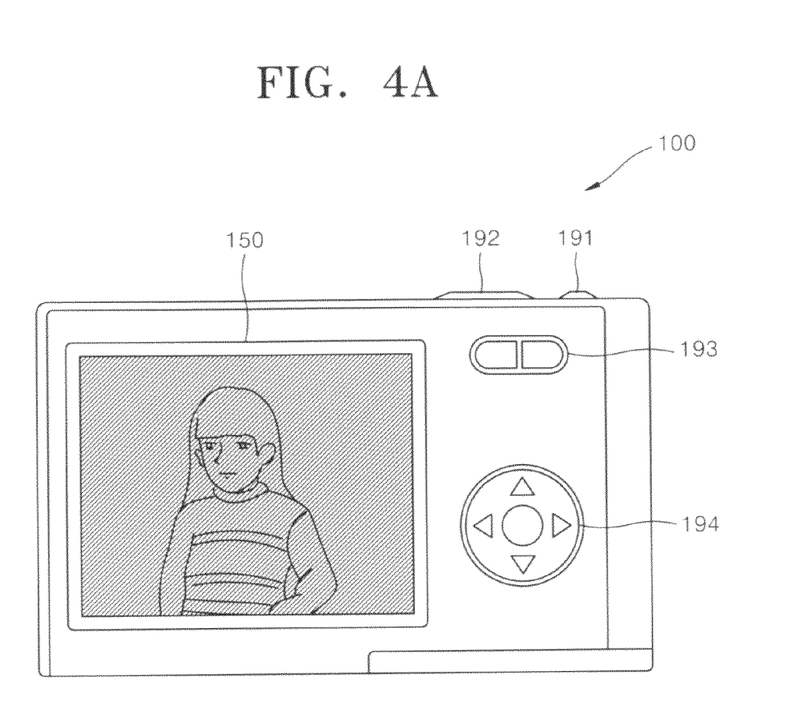
FIGS. 4A and 4B are diagrams for describing an example of an embodiment when a face is not recognized in the method illustrated in FIG. 3.

For example, in FIG. 4A, the first image signal is displayed on a displayer 150 of a digital photographing apparatus 100. It can be seen that the displayer 150 displays an image of a girl under dark light. The digital photographing apparatus 100 of FIG. 4A is an example of an embodiment of the digital photographing apparatus 100 of FIG. 1. The rear of the digital photographing apparatus 100 includes the displayer 150, a power supply button 191, a shutter release button 192 for performing photographing for record and reproduction, a wide angle-zoom and telephoto-zoom button 193, and various function buttons 194.

In FIG. 4A, the face of the subject is not recognized because the image on the displayer 150 is dark.

Figure 4B:
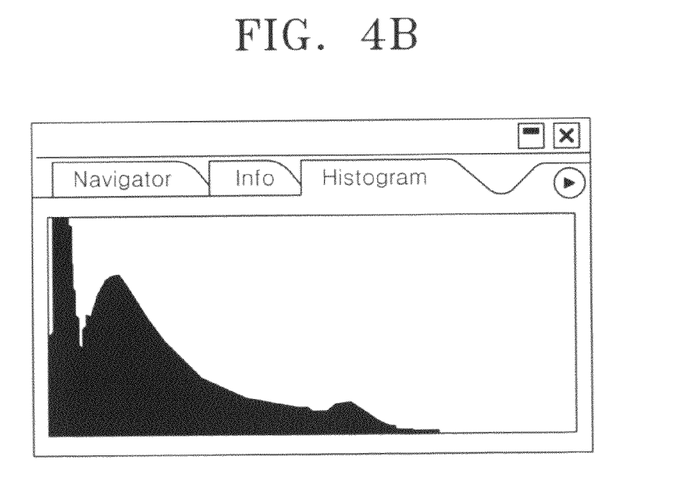

FIG. 4B illustrates an example of a histogram of the first image signal realizing the image displayed on the displayer 150 of FIG. 4A. According to the histogram of FIG. 4B, it can be seen that the first image signal includes a lot of dark colors. A database of histograms that can recognize a face is prepared based on an empirical value, and it can be determined that the face cannot be recognized when the histogram of the first image signal does not belong to the database. Moreover, the histogram of the first image signal may be separately stored in a database according to an exposure value. For example, the histogram of the first image signal can be stored in a database according to dark color components and bright color components. Accordingly, when the histogram of the first image signal shows a lot of dark color components, the exposure value is increased, and when the histogram of the first image signal shows a lot of bright color components, the exposure value is decreased.

Referring back to FIG. 3, when the face cannot be recognized from the first image signal, the exposure value is adjusted in operation S15. In operation S16, a second image signal is generated by adjusting the exposure value from the first image signal. When the face of the subject can be recognized from the first image signal, a face recognition algorithm is performed in operation S18.

Figure 5:
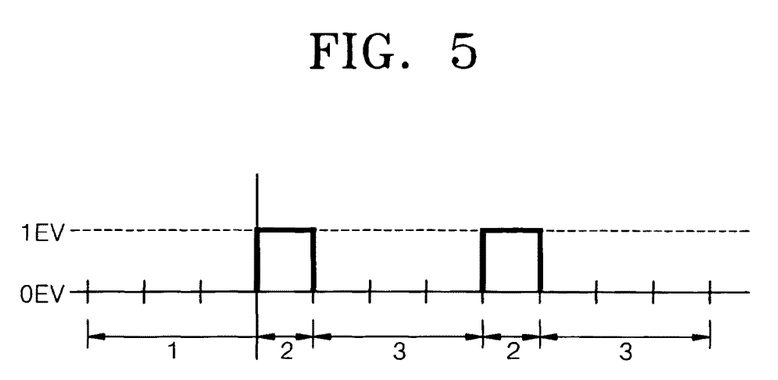
FIG. 5 is a graph for describing an example of a method of adjusting an exposure value when a face is not recognized in the method illustrated in FIG. 3, according to an embodiment of the present invention.

For example, according to the histogram of the first image signal illustrated in FIG. 4B, when the face cannot be recognized due to too many dark color components, the exposure value is increased. In detail, referring to FIG. 5, the exposure value is increased from 0 EV to 1 EV. In FIG. 5, the first image signal is generated during a first period, and the image signal processed second image signal is generated during a second period by increasing the exposure value. The exposure value is adjusted in a pulse form, and is temporarily increased only during the second period. Then, the first image signal is generated when the exposure value is returned to the original value, i.e. during a third period. Here, the first image signal during the first or third period may be displayed on the displayer 150. If the second image signal obtained by increasing the exposure value between the first and third periods, a flickering image may be displayed, and thus only the first image signal is displayed on the displayer 150.

Figure 6A:
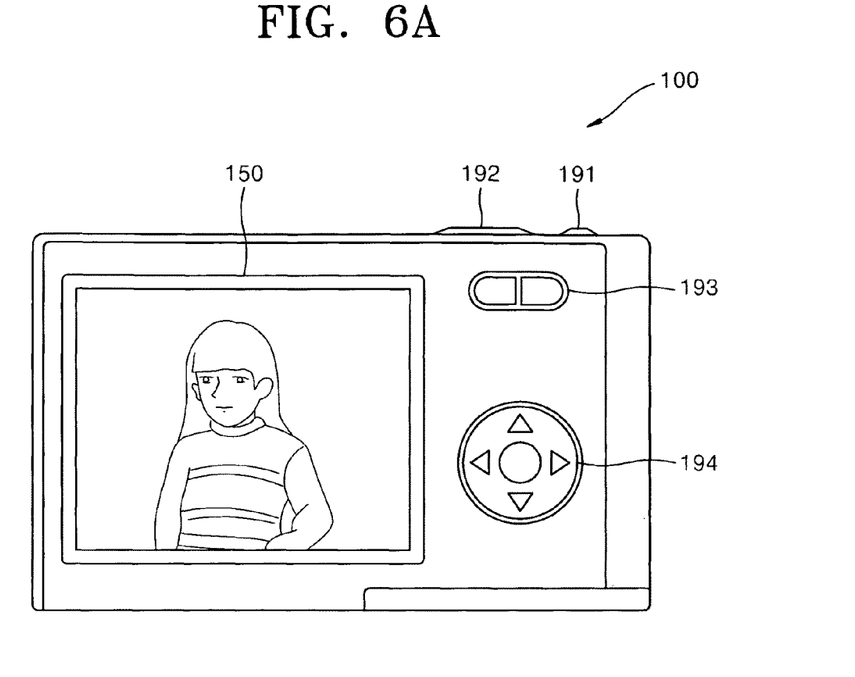
FIGS. 6A and 6B are diagrams for describing an example of an embodiment when an exposure value is adjusted for face recognition in the method illustrated in FIG. 3.
Figure 6B:
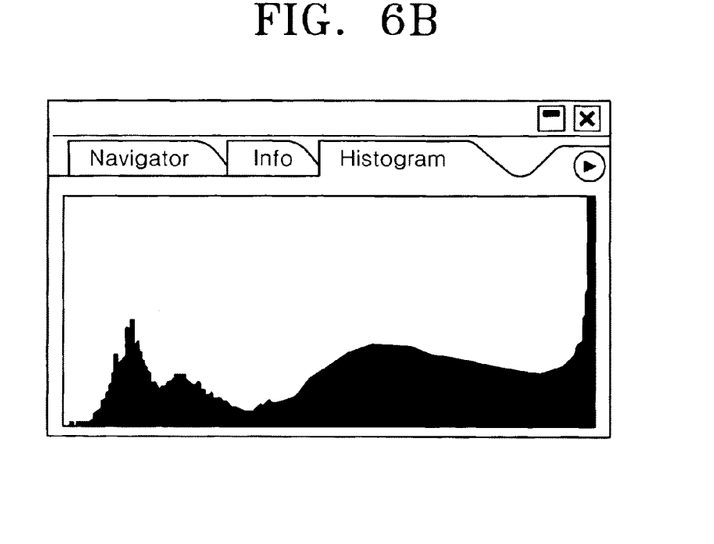

FIGS. 6A and 6B are diagrams respectively illustrating an example of an image in which the second image signal displayed on a displayer 150, and an example of a histogram of the second image signal. The second image signal is generated by increasing the exposure value to 1 EV from the first image signal, and can display a bright image on the displayer 150. Looking at the histogram of the second image signal, it can be seen that the second image signal includes a lot of bright color components.

In operation S17, it is determined again whether the face of the subject can be recognized from the second image signal in which the exposure value is adjusted as above. If it is determined that the face can be recognized in operation S17, the face is recognized by performing a face recognition algorithm from the second image signal in operation S18. Then, the exposure value is determined in operation S19 based on the recognized face, and a third image signal is generated in operation S20 according to the determined exposure value. If it is determined that the face cannot be recognized in operation S17, the exposure value is adjusted again in operation S15.

Figure 7:
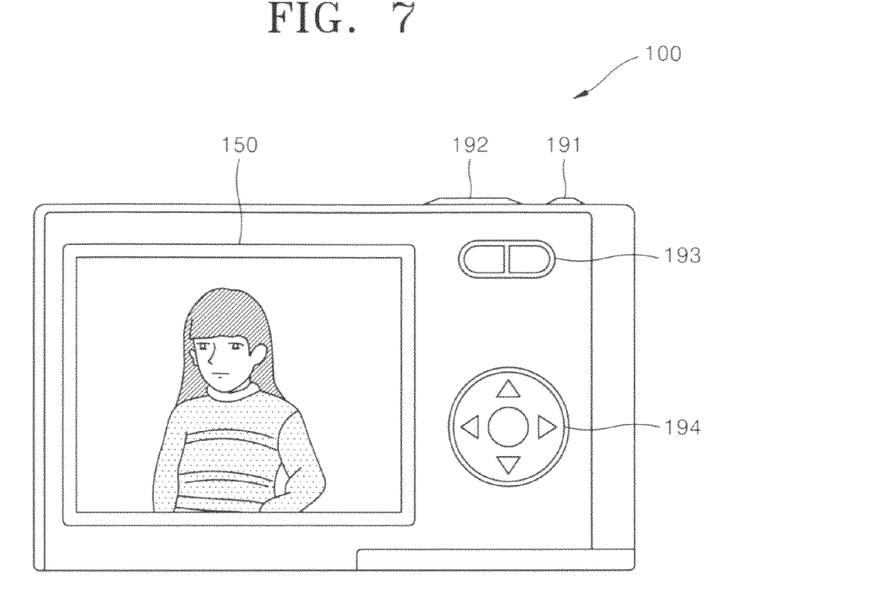
FIG. 7 is a diagram for describing an example of an embodiment when an exposure value is adjusted based on a recognized face in the method illustrated in FIG. 3.

FIG. 7 is a diagram illustrating an example of displaying the third image signal, which is exposed based on the recognized face, on a displayer 150. According to the example of FIG. 7, an image of a clear face of the subject can be displayed from the third image signal.

The image of a clear face of the subject can be obtained by adjusting the exposure value of the first image signal, performing the face recognition algorithm on the second image signal in which the exposure value is adjusted, and adjusting the exposure value of the first image signal based on the recognized face. In other words, an image photographed under dark light, such as a backlight, or too bright light can be converted to an image with a clear face of the subject by applying the face recognition algorithm.

Figure 8:
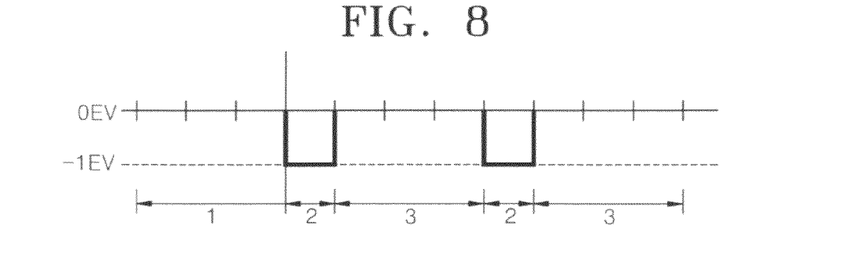
FIGS. 8 and 9 are graphs for describing an example of a method of adjusting an exposure value when a face is not recognized in the method illustrated in FIG. 3, according to another embodiment of the present invention.
Figure 9:
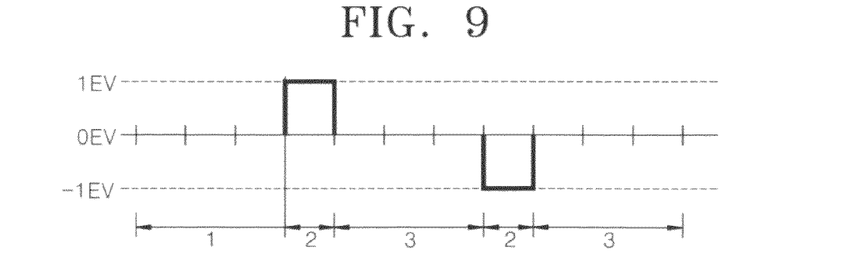

FIGS. 8 and 9 are graphs for describing an example of a method of adjusting an exposure value when a face is not recognized in the method illustrated in FIG. 3, according to another embodiment of the present invention.

In detail, FIG. 8 is a graph for describing a method of adjusting an exposure value when a face cannot be recognized because an image is too bright. For example, when a first image signal realizes a lot of bright color components, the exposure value is decreased by one gradation from 0 EV to −1 EV, and then a second image signal is generated by processing the first image signal according to −1 EV. Then, a face recognition algorithm is performed from the second image signal.

In the example of FIG. 9, the face is recognized by decreasing the exposure value by one gradation and then by increasing the exposure value by one gradation. In detail, if the face cannot be recognized, the exposure value of the first image signal is increased from 0 EV to 1 EV so as to generate the second image signal, and then the face recognition algorithm is performed from the second image signal. Then, the exposure value of the first image signal is decreased from 0 EV to −1 EV so as to generate the second image signal, and then the face recognition algorithm is performed. Accordingly, the face recognition algorithm is performed by applying the exposure value according to the method illustrated in FIG. 9, without determining whether the exposure value of the first signal is to be increased or decreased in order to recognize the face.

The present invention provides a digital photographing apparatus, which can perform a face recognition algorithm by adjusting an exposure value in dark light, such as a backlight, or too bright light, and a method of controlling the same. Accordingly, a desired image can be obtained by effectively performing the face recognition algorithm.

While the present invention has been particularly shown and described with reference to exemplary embodiments thereof, it will be understood by those having ordinary skill in the art that various changes in form and details may be made therein without departing from the spirit and scope of the present invention as defined by the following claims.

What is claimed is:

1. A method of controlling a digital photographing apparatus, the method comprising:
generating a first image signal by photographing a face of a subject;
performing a face recognition algorithm by using the first image signal;
adjusting an exposure value when the face cannot be recognized from the first image signal;
generating a second image signal by photographing the face of the subject under the adjusted exposure value; and
performing the face recognition algorithm by using the second image signal;
determining the exposure value based on the recognized face in the second image signal; and
generating a third image signal by photographing the subject under the determined exposure value, wherein the exposure value is determined according to a first release signal and the third image signal is generated by photographing the subject according to a second release signal.

2. The method of claim 1, wherein in the adjusting of the exposure value, when the face is not recognized because a current exposure value is bigger than a standard exposure value for recognizing a face or a standard exposure value range, adjusting the exposure value to a first exposure value that is smaller than the current exposure value, and when the face is not recognized because the current exposure value is smaller than the standard exposure value or the standard exposure value range, adjusting the exposure value to a second exposure value that is bigger than the current exposure value.

3. The method of claim 2, wherein the first or second exposure value is equal to the standard exposure value or corresponds to the standard exposure value range.

4. The method of claim 1, wherein in the adjusting of the exposure value, the exposure value is converted to have at least one pulse form.

5. The method of claim 4, wherein the first image signal is generated in a section where a signal for converting the exposure value to have a pulse form is not inputted, and the second image signal is generated in a section where the signal is inputted.

6. The method of claim 1, further comprising displaying the first image signal in a preview mode.

7. The method of claim 1, further comprising displaying the third image signal in a play back mode.

8. A digital photographing apparatus, comprising:
an imaging unit, which generates an image signal by photographing a face of a subject;
a face recognizer, which recognizes the face from the image signal; and
a first exposure controller, which controls an exposure value when the face is not recognized by the face recognizer;
a second exposure controller, which determines the exposure value based on the recognized face when the face of the subject is recognized by the face recognizer; and
a manipulator, which inputs a first release signal so that the exposure value is determined by the second exposure controller, and inputs a second release signal so that a third image signal is generated.

9. The digital photographing apparatus of claim 8, wherein the first exposure controller adjusts the exposure value to a first exposure value that is smaller than a current exposure value when the face is not recognized because the current exposure value is bigger than a standard exposure value for recognizing a face or a standard exposure value range, and adjusts the exposure value to a second exposure value that is bigger than the current exposure value when the face is not recognized because the current exposure value is smaller than the standard exposure value or the standard exposure value range.

10. The digital photographing apparatus of claim 8, wherein the imaging unit generates a first image signal under the current exposure value, generates a second image signal under the exposure value adjusted by the first exposure controller, and generates a third image signal under the exposure value determined by the second exposure controller.

11. The digital photographing apparatus of claim 10, wherein the face recognizer comprises:
a face recognition determiner, which determines whether the face of the subject can be recognized from the first image signal; and
a face recognition algorithm performer, which recognizes the face by performing a face recognition algorithm from the second image signal.

12. The digital photographing apparatus of claim 11, further comprising
a displayer, which displays the first image signal in a preview mode and displays the third image signal in a play back mode.

* * * * *